P. W. MOSHER.
SPRING NUT.
APPLICATION FILED OCT. 16, 1911.
1,049,590.
Patented Jan. 7, 1913.
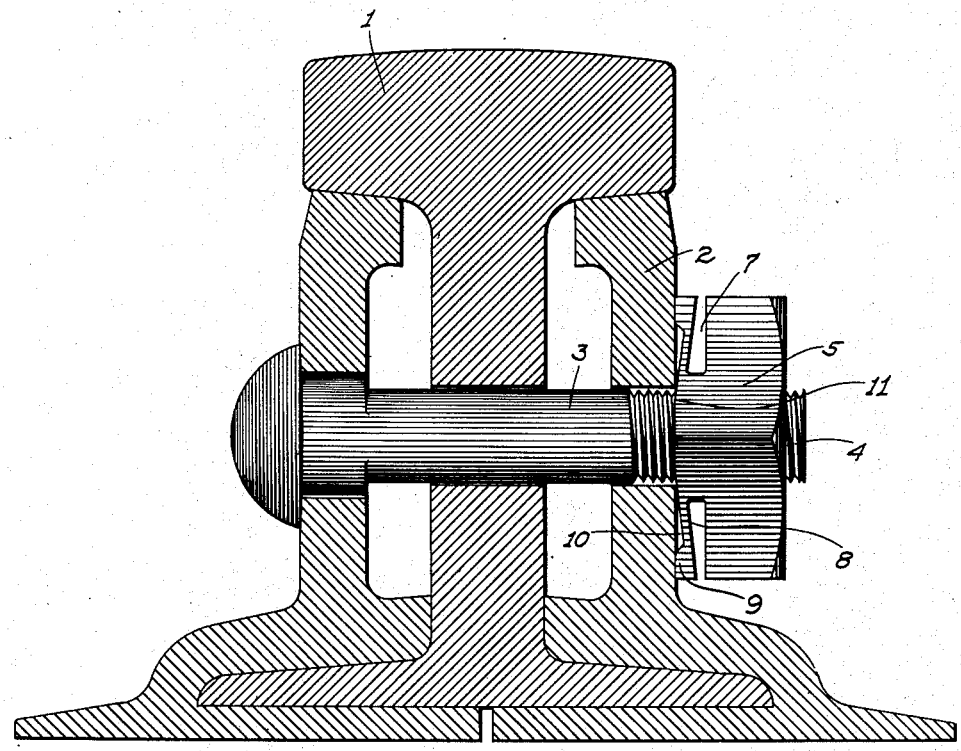
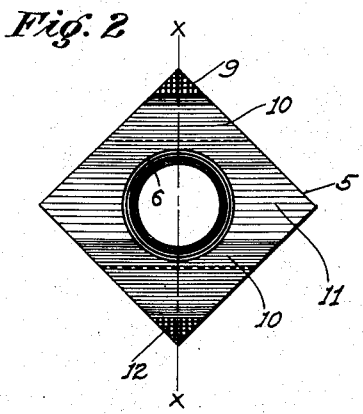
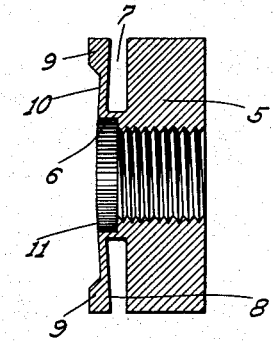
Inventor
P. W. Mosher

UNITED STATES PATENT OFFICE.

PETER W. MOSHER, OF STOCKTON, CALIFORNIA, ASSIGNOR OF ONE-HALF TO HORACE G. LEARNED, OF STOCKTON, CALIFORNIA.

SPRING-NUT.

1,049,590.     Specification of Letters Patent.     Patented Jan. 7, 1913.

Application filed October 16, 1911. Serial No. 654,903.

*To all whom it may concern:*

Be it known that I, PETER W. MOSHER, a citizen of the United States, residing at Stockton, in the county of San Joaquin, State of California, have invented certain new and useful Improvements in Spring-Nuts; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in nuts and is designed to cover nuts used generally for all purposes, but more particularly is designed for use on railroads.

As is a well known fact, there is a great deal of wear on railroads owing to the jarring caused by trains riding over the rails, which wearing causes the nuts to become loose with relation to the angle plates and causes a disagreeable noise. To avoid this, many roads are using spring washers, and others are using counter sunk nuts to protect two threads against wear, upon which threads the nut may be screwed up as the wear occurs.

My improved spring nut is designed to hold the nut in tension against the angle plate regardless of the wear, and my improved structure can be used with or without the counter sunk feature above mentioned. Also for other work such as automobiles, machinery or in fact, any structural work, my improved nut can be used and will take the place of a lock nut.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a sectional view of a railroad rail and angle plates showing a bolt projecting therethrough upon which is mounted one of my improved nuts. Fig. 2 is a front elevation of one of my improved nuts. Fig. 3 is a sectional view taken on a line X—X of Fig. 2.

Referring now more particularly to the characters of reference on the drawings, 1 designates the rail of a railroad, and 2 the usual angle plates thereon, while 3 designates a bolt projecting therethrough and having a threaded portion 4.

The numeral 5 designates the nut which may or may not be provided with a counter sunk portion 6 to protect two of the threads 4, as set forth above.

My improved structure provides a slot 7 cut into the corners of the nuts near the inner face, forming projecting lips and the nuts are made of steel and tempered, which makes these lips 8 resilient or of a spring nature. Then on the upper ends of these lips I provide projecting lugs 9, there being a space 10 cut from the face of the nut obliquely up to these lugs 9, which leaves an intervening clear space as at 10.

In practice the nut is screwed upon the bolt and the lugs 9 first impinge upon the angle plate 2 and as the nut is advanced the lips 8 are forced backward into the space 7, which causes a resilient tension between the nut 5 and the angle plates 2, which will take up and compensate for the wear which has been hereinbefore described.

In order that the tension of the lips 8 may always be maintained and not killed by coming up against the nut proper, the inner face of the nut projecting beyond the space 10, as at 11, engages the angle plate 2 before the back of the lips 8 strike the nut proper on the other side of the space 7, and hence this permits these lips 8 to maintain their tension at all times.

The lugs 9 are provided with serrated or file like surfaces 12 so that when the nut is to be removed from the bolt, these surfaces will act in such a manner as to prevent the lugs 9 from sticking to the angle plate through rust or otherwise, in other words, they will have the effect of filing their way clear from the angle plates.

From the foregoing description it will readily appear that I have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A device of the character described comprising a nut proper, such nut being of the same width along its entire length, slots cut in said nut at the corners thereof and forming lips, such lips being tempered to form springs, there being a portion of said lips projecting beyond the inner face of said nut, such slots being of sufficient width that when said projecting portions of said lips are forced into alinement with the inner face of said nut, said lips will not engage the inner sides of said slots, as described.

2. A device of the character described comprising a nut, slots cut in said nut at the corners thereof and forming lips, projecting lugs on the upper ends of said lips, the inner face of said nut being provided with a recess cut from the face of said nut obliquely up to said lugs, said lips being tempered to form springs, as described.

3. A device of the character described comprising a nut having slots cut into its corners forming lips, projecting lugs on the upper ends of said lips, serrations on the face of said lugs, said lips being formed into spring members, as described.

4. A device of the character described comprising a bolt, a nut mounted on said bolt, such nut having slots cut in its corners forming lips, such nut being provided with a recess in its inner end, such recess being of a greater width than the width of the threaded orifice of said nut, projecting lugs on said lips projecting normally beyond the plane of the inner face of said nut, the inner face of such nut being cut obliquely from the edge of said first named orifice to said lugs, such slots being of sufficient width that when said nut is mounted on said bolt, and abutted against a part to be bolted, the outer ends of said lugs and the inner face of said nut around said first named orifice will all abut against the part to be bolted in the same plane with respect to each other, as shown and described.

5. A device of the character described comprising a nut having a centrally threaded orifice, said nut having square flat sides, each side being disposed in the same plane from end to end and side to side, said nut being provided with slots cut into the corners formed by the joining of adjacent sides, such slots forming lips, a projecting lug on each lip at the upper corner, each lug being provided with a serrated outer surface, the face of said nut being provided with a recess, the bottom of said recess extending obliquely from the face of said nut up to said lugs, as described.

In testimony whereof I affix my signature in presence of two witnesses.

PETER W. MOSHER.

Witnesses:
    PERCY S. WEBSTER,
    FRANK H. CARTER.